May 17, 1966 E. L. MOYER ETAL 3,251,437
AIR COOLED DISK BRAKE
Filed April 13, 1964 3 Sheets-Sheet 2
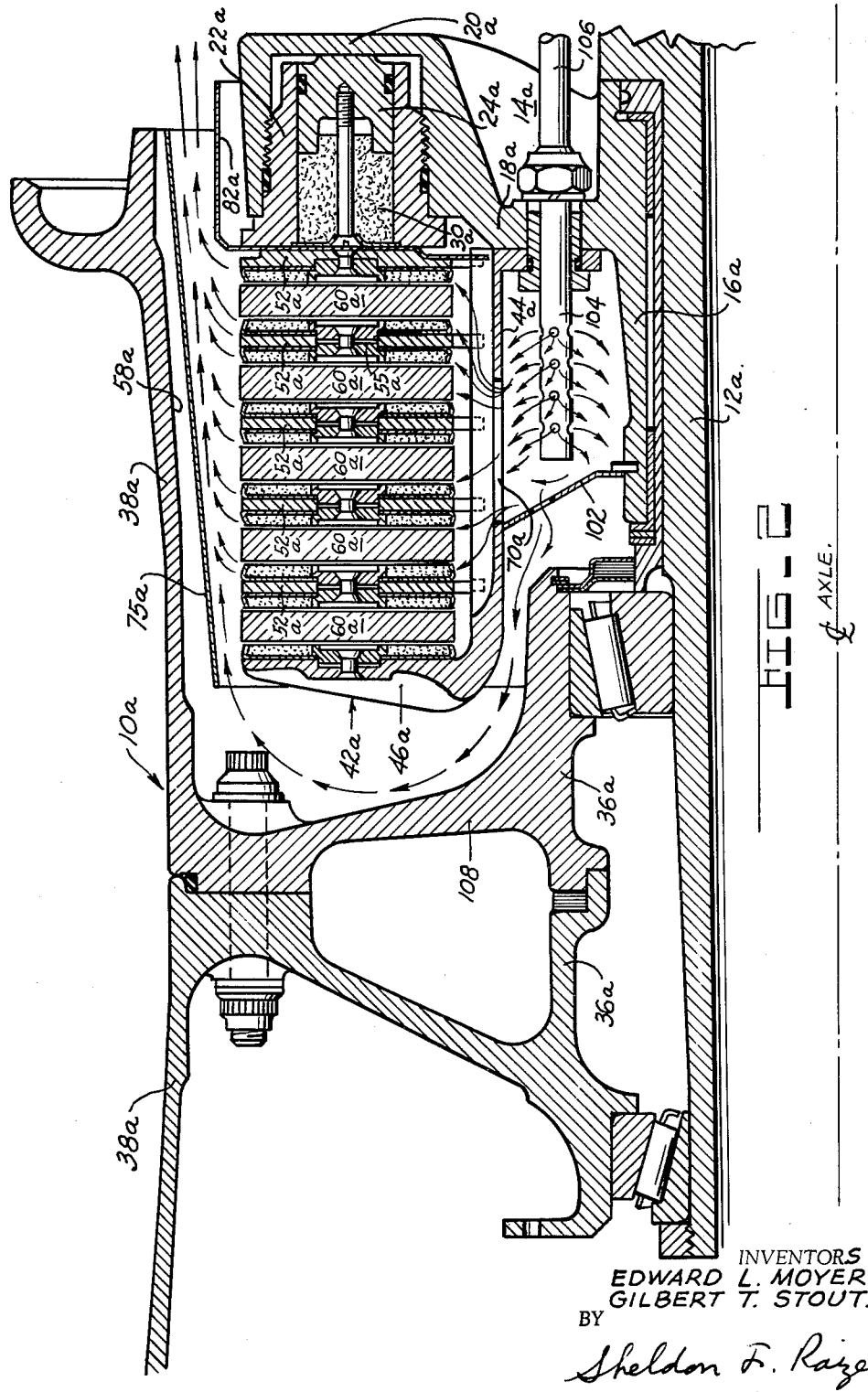
INVENTORS
EDWARD L. MOYER.
GILBERT T. STOUT.
BY
Sheldon F. Razee
ATTORNEY.

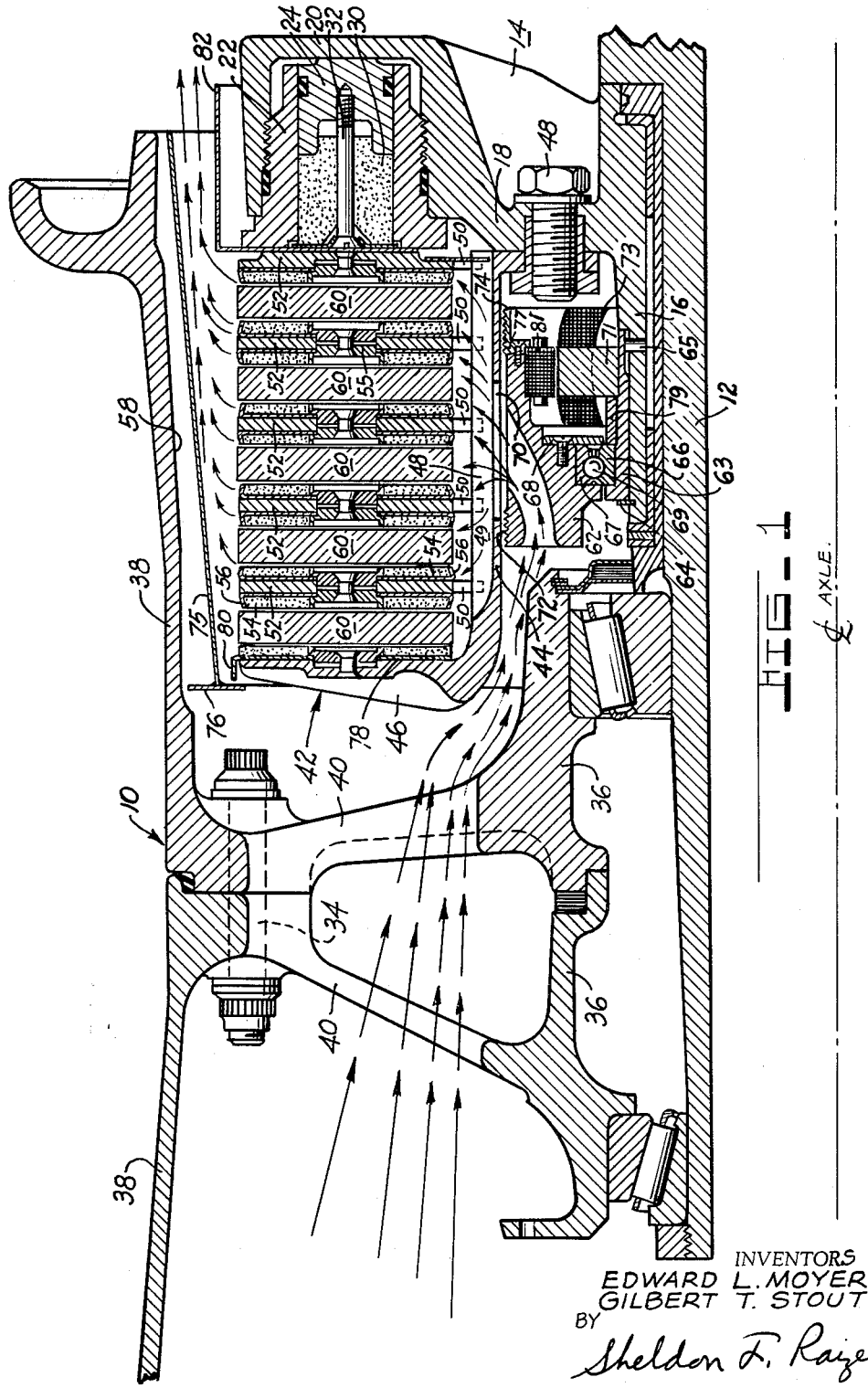

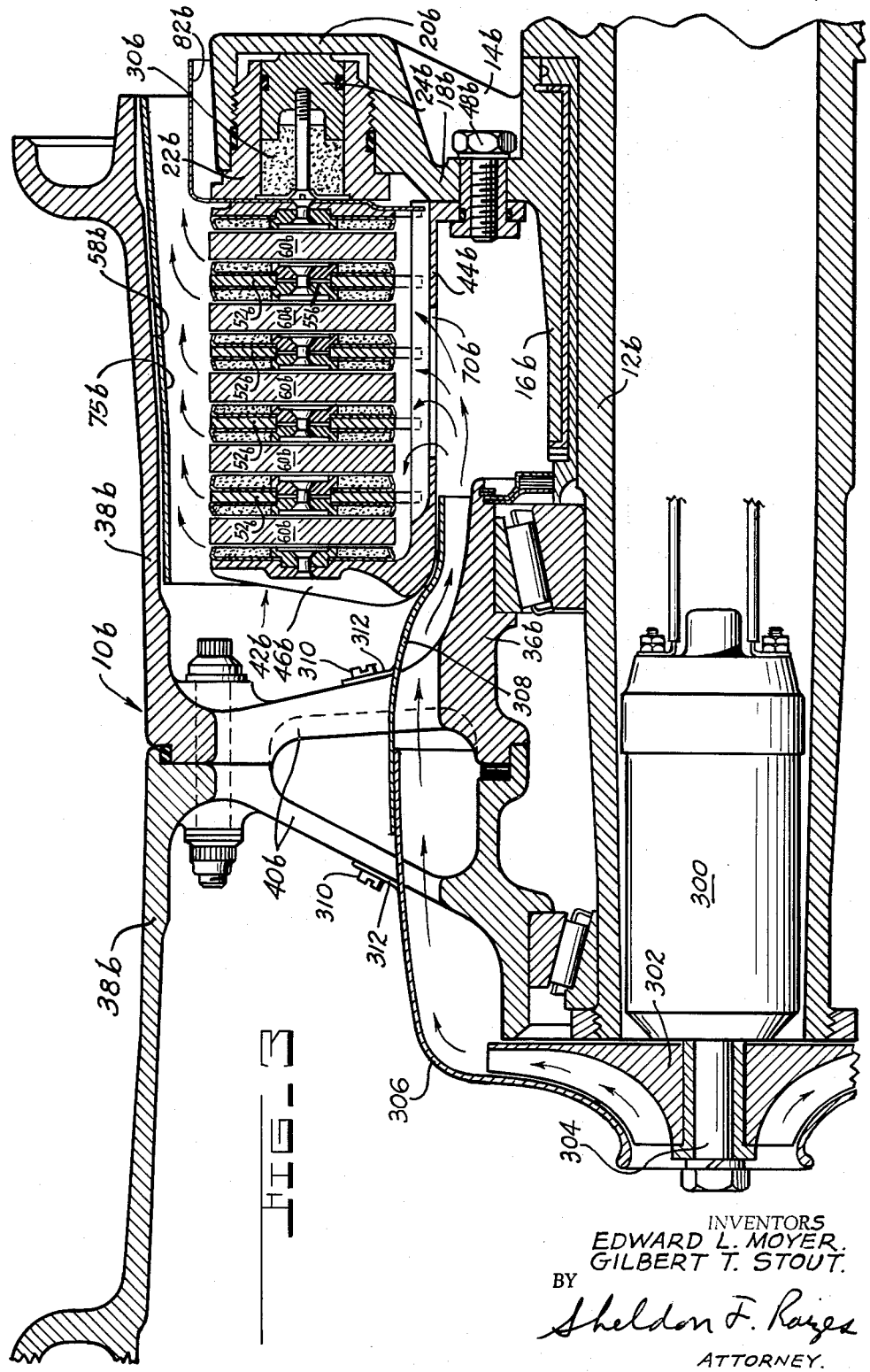

3,251,437
AIR COOLED DISK BRAKE
Edward L. Moyer and Gilbert T. Stout, South Bend, Ind., assignors to The Bendix Corporation, South Bend, Ind., a corporation of Delaware
Filed Apr. 13, 1964, Ser. No. 359,048
8 Claims. (Cl. 188—264)

This invention relates to a forced air cooled disk brake.

Before an airplane may safely take off, it brakes must be cooled down to a predetermined temperature to be capable of stopping the airplane in case of a rejected take off. This means that after an airplane has landed, a certain period of time must elapse for its brakes to cool down to the predetermined temperature before it may take off again. Therefore, it is most advantageous for the brakes to be cooled as quickly as possible.

Accordingly, it is an object of this invention to provide means for coooling the brakes of any heavy duty vehicle in a minimum period of time.

It is a further object of this invention to provide a means for forcing air cooling of an airplane disk brake which is capable of cooling the brake much faster than any forced air cooling method known today.

Yet another object of the invention is to provide a disk brake with forced air cooling wherein air will be forced between a plurality of stator members and rotor members of the brake.

A still further object of this invention is to provide a forced air cooled brake wherein a fan sucks in air and then forces the air between a plurality of stator members and rotor members of a disk brake.

Other objects of the invention will become apparent from the following description with reference to the drawings wherein:

FIGURE 1 is a section view of one-half of a symmetrical wheel and brake assembly illustrating one embodiment of the invention;

FIGURE 2 is a view similar to FIGURE 1 illustrating a second embodiment of the invention; and FIGURE 3 is a view similar to FIGURE 1 illustrating a third embodiment of the invention.

Referring to FIGURE 1, there is illustrated a wheel and brake assembly comprising a wheel 10 rotatably mounted on a stationary axle 12 and a stationary brake carrier member 14 which is rotatably mounted on the axle 12. The carrier member 14 is restrained by a torque reaction link on a well known Bogey beam arrangement (not shown). However, the carrier member 14 may be restrained by a direct bolt connection to the axle. For practical purposes, the carrier member may be considered stationary during braking and should be considered as a stationary member hereinafter. The construction for rotatably mounting the wheel 10 to axle 12 and fixing the stationary carrier 14 to the axle 12 is well known and a description thereof is not deemed to be necessary. The carrier member 14 comprises an annular sleeve 16 surrounding the axle 12 and an annular flanged portion 18 extending in a direction outwardly away from and generally perpendicular to the axle 12. The flange 18 contains a plurality of fluid cylinders 20 each of which has a protective sleeve 22 threadedly secured thereto in which a piston 24 is slidably received. A block of insulating material 30 is secured to the head end of the piston by a threaded pin 32 for protecting the hydraulic brake fluid from the heat generated during braking. The wheel 10 comprises two sections fastened together by a plurality of bolts 34. The hub portion 36 and the rim portion 38 of the wheel are interconnected by a plurality of spokes 40 defining therebetween a plurality of windows through which air may pass for cooling. A torque tube 42 comprising a sleeve 44 and an annular backing plate flange 46 extending away from and generally perpendicular to the axle 12 is fixedly secured to the carrier member 14 by a plurality of circumferentially spaced bolt and nut assemblies 48.

The torque tube 42 has a plurality of axially extending splines 49 which are respectively received in one of a plurality of slots 50 located on a respective one of a plurality of stator members 52 for allowing axial sliding of the stator members 52 relative to the torque tube member 42. Each stator member 52 has a plurality of friction pads 54 located in cups 56 secured to the stator member 52 by fasteners 55. The radial inner surface 58 of the wheel rim 38 has a plurality of splines (not shown) which are received in a respective one of a plurality of slots (not shown) located on a plurality of rotor members 60 to allow axial sliding of the rotor members relative to the wheel 10 and the torque tube 42. An annular rotatable impeller 62 is located in the cavity formed by the sleeve 44 and of the torque tube 42 and the sleeve 16 of the carrier member 14. An inverted squirrel cage motor is provided for rotating the impeller. A backbone 63 is secured to the carrier sleeve 16 by a snap ring 64 and is prevented from rotating by a keyed connection 65. An annular bearing race 66 is pressed onto the backbone 63 and a bearing race 67 is clamped to the impeller by a ring 68 secured to the impeller. A plurality of ball bearings 69 are located between the races permitting rotation of the impeller relative to the carrier 14. The ring 68 also acts as a seal for the bearing assembly. The squirrel cage motor comprises a plurality of circumferentially spaced stator poles 71, pressed on the backbone 63, windings 73 fixed to each stator pole, and a plurality of circumferentially spaced rotor bars 81 clamped to the impeller by a flange 77 secured to the impeller. A spacer 79 is provided between the bearing race 66 and the stator poles 71 for locating purposes. The impeller 62 has mixed flow characteristics for converting axial air flow to centrifugal air flow. A plurality of openings 70 are provided in the torque tube 42 and are aligned with the impeller openings for receiving the forced air therethrough. Well known differential pressure annular seals 72 are provided on the impeller which are at a clearance of approximately .005 inch from the radially inner surface 74 of the torque tube 42. A heat shield 75 is provided between the inner surface 58 of the wheel rim 38 and the radial outer edges of the rotor and stator members to protect the rim from heat generated during brake application. An annular shield 82 is attached to the stator member 52 closed to the piston 24 by any well known fastening means (not shown) and in combination with the heat shield 75 defines a path for the hot air thus protecting the fluid in the hydraulic cylinder 20 from the hot air being discharged.

In operation, upon brake application, hydraulic pressure forces the piston 24 outwardly from the cylinder housing 20 to effect axial movement of the stator members 52 and the rotor members 60 thereby squeezing them together to effect braking of the wheel 10. The squirrel cage motor may be actuated to rotate the impeller 62 and cause air to be sucked in through the windows between spokes 40 and then converted to radial flow between the rotor members 60 and stator members 52, past the area between the heat shield 75 and the radial outer edges of the rotor and stator members and then between the shields 75 and 82 to outside the wheel. A plurality of baffle flanges 76, each of which extends in a circumferential direction between a respective pair of splines on the wheel rim, is attached to the heat shield 75 and an annular plate 78 terminating in an annular baffle flange 80 is attached to the torque tube 42. The baffle flange 76 and the baffle flange 80 co-act to prevent hot air from passing back toward the windows and then recirculated through the annular impeller.

With reference to FIGURE 2, those elements which are the same as the previous embodiment are given the same reference numerals wiith a small "a" affixed thereto. An annular perforated shield 102 is inserted between the annular sleeve 44a of the torque tube and the annular sleeve 16a of the carrier member 14a. A plurality of circumferentially spaced air inlet tubes 104 extend into the cavity defined by the flange 18a of the carrier member 14a, the sleeve 16a of the carrier member 14a, the shield 102 and the sleeve 44a of the torque tube 42a, for the purpose of delivering air under pressure into the cavity, through the opening 70a in a torque tube sleeve, through the spaces between the rotor elements 60a and the stator members 52a and to outside the wheel through a path defined by the shield 82a and the heat shield 75a. A tube 106 conveys air under pressure to the inlet tube 104 from any source of pressure as, for instance, a compressor. The perforated shield 102 allows a limited supply of air therethrough whtich passes between the hub 36a and the torque tube 42a. The portion 108 interconnecting the hub and rim of the wheel is solid to deflect the air passing through the perforated shield into a path which is formed by the radial outer edges of the rotor and stator members and the inner surface 58a of the rim 38 for the purpose of providing a protective blanket of cool air over the wheel rim 38a to protect the rim from the hot air which has passed between the rotor and stator members.

If a protective blanket of air over the wheel is not desired, the shield 82a may be solid and the portion 108 may be of the same spoke and window construction as in the previous embodiment.

Referring to FIGURE 3, all elements which are the same as in the previous embodiments are given the same reference numerals with a "b" affixed thereto. An electric motor 300 is fixed to the axle 12b by any well known means and a mixed flow impeller 302 is fixed to a drive shaft 304 driven by the motor 300. A shroud comprises annular members 306 and 308 secured to the spokes 40b by a plurality of screens 310 inserted through tabs 312. The shroud rotates with the wheel and directs forced air from the impeller to the cavity between the torque tube sleeve 44b and the carrier sleeve 16b whereby the air will then be discharged therefrom through the opening 70b and between the rotor 60b and stator 52b elements and then between the shield 75b and baffle 82b.

From tests conducted, it has been found that the cooling embodiments disclosed herein are capable of cooling the brakes in about one-twentieth (1/20) the time of normal still air connection and in about one-fourth (1/4) to one-half (1/2) the time of a system utilizing a propeller vane for forcing air in an axial flow path past the brake elements.

From the above it can readily be seen that the above objects are achieved by the invention disclosed herein. It is our intention to include within the scope of the following claims all equivalent applications of the invention whereby the same or substantially the same results may be obtained.

We claim:
1. In a disk brake: an axle, a carrier member secured to said axle, a torque transmitting member operatively connected to said axle and fixed against movement relative to said carrier member, said torque transmitting member having an axially extending portion radially spaced from said axle, at least one opening in said torque transmitting member portion, an annular impeller surrounding said axle and mounted for rotation in the space between said axially extending portion of said torque transmitting member and said axle, said impeller being arranged relative to said opening to force air therethrough upon rotation thereof, and electrically operated means for rotating said impeller.

2. In a disk brake: an axle, a carrier member secured to said axle, a torque tube member operatively connected to said axle and fixed against movement relative to said carrier member, said torque tube member comprising a sleeve surrounding said axle, an annular cavity between said axle and said sleeve, at least one opening in said torque tube member sleeve, an annular impeller located in said cavity surrounding said axle and mounted for rotation relative to said members, said annular impeller being arranged relative to said opening to force air therethrough upon rotation thereof, and electrically operated means for rotating said annular impeller.

3. In a disk brake: an axle, an annular carrier member secured to said axle, said carrier member comprising a sleeve surrounding said axle, an annular torque tube member fixed against movement relative to said carrier member, said torque tube member comprising a sleeve surrounding said carrier member sleeve and fixedly secured to said carrier member, an annular cavity between said sleeves, a plurality of openings in said torque tube member sleeve, an annular impeller located in said cavity surrounding said axle and mounted on one of said members for rotation relative to said members, said annular impeller being arranged relative to said openings to force air therethrough upon rotation thereof, and electrically operated means for rotating said annular impeller.

4. A disk brake comprising: an axle, a carrier member secured to said axle, said carrier member comprising a flange extending in a direction away from and generally perpendicular to said axle, a torque tube member operatively connected to said axle and fixed against movement relative to said carrier member, said torque tube member comprising a sleeve surrounding said axle, a flange extending from said torque tube sleeve in a direction away from and generally perpendicular to said axle, a wheel comprising a hub portion rotatably mounted on said axle, a rim portion radially spaced from said hub, and a portion interconnecting said hub and rim, said interconnecting portion having a plurailty of circumferentially spaced openings therein, an annular space between said torque tube sleeve and said rim, said flanges being axially spaced from each other, a plurality of rotor elements axially slidably mounted on said rim, a plurality of stator elements slidably mounted on said torque tube member, said rotor and stator elements being located within the space between said flanges, means for squeezing said elements together for stopping rotation of said wheel, an annular cavity between said axle and said sleeve, at least one opening in said torque tube member sleeve, an annular impeller located in said cavity surrounding said axle and mounted on one of said members for rotation relative to said members, said annular impeller being arranged relative to said openings to force air therethrough upon rotation thereof, a space located between said torque tube member and said hub communicating said annular impeller with said interconnecting portion openings, and electrically operated means for rotating said annular impeller whereby air may be sucked past said plurality of openings and forced through said torque tube openings and through spaces between said elements.

5. A structure as recited in claim 4 wherein the free edge of said torque tube flange is spaced from said rim, baffle means located between said rim and said free edge of said torque tube flange for preventing recirculation of forced air.

6. The structure as recited in claim 5 wherein a heat shield is provided on the radial inner surface of said rim, said baffle means comprising means located on said heat shield and means located on said torque tube flange coacting with each other to prevent recirculation of forced air.

7. The structure as recited in claim 6 wherein said means for squeezing said elements comprises at least one hydraulic cylinder located on said carrier member flange and a pressure responsive member in said cylinder, an annular second heat shield located between said first mentioned heat shield and said hydraulic cylinder, said heat shields forming a path for conducting forced air after it has passed through the space between said elements.

8. The structure as recited in claim 4 wherein said torque tube member is secured to said carrier member.

References Cited by the Examiner
UNITED STATES PATENTS

| | | | |
|---|---|---|---|
| 1,742,804 | 1/1930 | Carhart | 192—113 |
| 2,655,236 | 10/1953 | Bachman. | |

FOREIGN PATENTS

| | | |
|---|---|---|
| 878,973 | 10/1961 | Great Britain. |
| 943,472 | 12/1963 | Great Britain. |
| 1,113,149 | 8/1961 | Germany. |

MILTON BUCHER, *Primary Examiner.*

ARTHUR L. LA POINT, *Examiner.*

G. E. A. HALVOSA, *Assistant Examiner.*